(12) United States Patent
Niemczewski (10) Patent No.: US 11,255,106 B2
(45) Date of Patent: *Feb. 22, 2022

(54) HYDRAULICALLY ACTUATED LOCKING LATCHING SYSTEM

(71) Applicant: FOREMOST UNIVERSAL LP, Lloydminster (CA)

(72) Inventor: Voytek Niemczewski, Calgary (CA)

(73) Assignee: Foremost Universal LP, Lloydminster (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,765

(22) Filed: Jun. 4, 2020

(65) Prior Publication Data

US 2020/0291675 A1 Sep. 17, 2020

Related U.S. Application Data

(63) Continuation of application No. 15/808,295, filed on Nov. 9, 2017, now Pat. No. 10,683,679.

(60) Provisional application No. 62/460,223, filed on Feb. 17, 2017.

(51) Int. Cl.
| | |
|---|---|
| *E05B 17/00* | (2006.01) |
| *B01J 3/03* | (2006.01) |
| *B65D 43/16* | (2006.01) |
| *B65D 45/20* | (2006.01) |
| *B65D 81/20* | (2006.01) |
| *E05B 51/02* | (2006.01) |
| *E05B 65/00* | (2006.01) |

(52) U.S. Cl.
CPC ............. *E05B 17/0025* (2013.01); *B01J 3/03* (2013.01); *B65D 43/163* (2013.01); *B65D 45/20* (2013.01); *B65D 81/2015* (2013.01); *E05B 51/02* (2013.01); *E05B 65/001* (2013.01); *E05Y 2900/518* (2013.01); *E05Y 2900/531* (2013.01)

(58) Field of Classification Search
CPC ........ B65D 45/28; B65D 45/16; B65D 45/20; B65D 45/24; B60P 3/2245; B60P 1/162; B60P 1/34; B60P 3/2215; E01H 1/047
See application file for complete search history.

(56) References Cited

U.S. PATENT DOCUMENTS

| | | | |
|---|---|---|---|
| 5,596,788 A | 1/1997 | Linville et al. | |
| 5,649,573 A | 7/1997 | Crum et al. | |
| 8,066,140 B1 | 11/2011 | Young et al. | |
| 2011/0031801 A1* | 2/2011 | Malatesta | B60P 3/2205 298/17 B |
| 2014/0010603 A1* | 1/2014 | Blais | B60P 1/60 406/39 |
| 2014/0017018 A1 | 1/2014 | Blais et al. | |
| 2015/0274057 A1* | 10/2015 | Hinde | B62B 3/04 298/22 R |

(Continued)

OTHER PUBLICATIONS

Photograph of 2006 GapVaX truck with Jurop style lock system.

*Primary Examiner* — Shawn M Braden
(74) *Attorney, Agent, or Firm* — McAndrews, Held & Malloy, Ltd.

(57) ABSTRACT

A door sealing system for a container having a container door is provided. The container can be part of a vacuum system, for example as mounted on a trailer. The sealing system is hydraulically actuated and includes a mechanical lock. A corresponding vacuum system and method of operation are also provided.

14 Claims, 7 Drawing Sheets

(56) References Cited

U.S. PATENT DOCUMENTS

| | | | |
|---|---|---|---|
| 2015/0329284 A1* | 11/2015 | Benet | B65D 90/10 |
| | | | 220/378 |
| 2016/0375815 A1 | 12/2016 | Sonnenburg | |
| 2017/0361754 A1 | 12/2017 | Trueman | |
| 2018/0236922 A1 | 8/2018 | Roberts et al. | |
| 2018/0238077 A1 | 8/2018 | Niemczewski | |

* cited by examiner

HYDRAULICALLY ACTUATED LOCKING LATCHING SYSTEM

CROSS REFERENCE TO RELATED APPLICATIONS

This application claims the benefit of priority to U.S. Provisional Patent Application Ser. No. 62/460,223 filed on Feb. 17, 2017, and entitled Hydraulically Actuated Locking Latching System, the contents of which are incorporated by reference. This application is a Continuation of U.S. patent Ser. No. 15/808,295, filed Nov. 9, 2017. U.S. Provisional Patent Application Ser. No. 62/460,223 and U.S. patent Ser. No. 15/808,295 are incorporated herein by reference and made a part hereof.

FIELD OF THE INVENTION

The present invention pertains to the field of sealed containers, and in particular to a method and apparatus for sealing a collection container in a vacuum system.

BACKGROUND

Various designs of quick acting closures and latches have been utilized on pressure vessels and/or containers in vacuum system. The commonly used current latching systems use manually operated wing nuts on tie rods attached to container/tank shell.

U.S. Pat. No. 8,066,140 discloses a container door and container door latching and sealing system used to seal a container of a vacuum system.

These types of latching systems are labor intensive, specifically when used in sealed container on trailers or trucks, as opening of door requires crew to be at the back of truck/trailer (tank), where they can be exposed to danger of uncontrolled door motion under residual internal tank pressure. The demand to frequently obtain access to pressure vessels and/or under vacuum containers has been increasing, thereby enhancing the need for a safe closure that provides quick opening and closing/sealing capabilities.

Therefore, there is a need for a latching system for a container in a vacuum system that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the invention, there is provided a hydraulically actuated locking latching system. According to one embodiment, there is provided a door sealing system for a container having a container door, the sealing system comprises one or more latches mounted to the container or to a frame in fixed relation with the container, the latches located proximate to an opening of the container to be covered by the container door, each latch hydraulically actuatable between a closed position and an open position and comprising: a sealing lever pivotably mounted to the container or to the frame; and a mechanical linkage mounted to the container or to the frame, wherein in the closed position, the sealing lever contacts and presses the container door in sealing engagement with the container, the sealing lever being mechanically held in the closed position by the mechanical linkage operating in a locking configuration; and in the open position, the mechanical linkage is moved out of the locking configuration and the sealing lever is pivoted clear of the container door.

According to one embodiment, there is provided a vacuum system comprising: a support frame; a container supported on the support frame and having a container door; and a door sealing system for the container. The sealing system comprises one or more latches mounted to the container or to the frame, the latches located proximate to an opening of the container to be covered by the container door, each latch hydraulically actuatable between a closed position and an open position and comprising: a sealing lever pivotably mounted to the container or to the frame; and a mechanical linkage mounted to the container or to the frame, wherein in the closed position, the sealing lever contacts and presses the container door in sealing engagement with the container, the sealing lever being mechanically held in the closed position by the mechanical linkage operating in a locking configuration; and in the open position, the mechanical linkage is moved out of the locking configuration and the sealing lever is pivoted clear of the container door.

According to one embodiment, there is provided a method for operating a container door of a container, which comprises sealing the container by disposing the container door over a corresponding opening of the container; and hydraulically actuating one or more latches into a closed position to cause respective sealing levers thereof to contact and press the container door in sealing engagement with the container, and to cause a mechanical linkage to operate in a locking configuration to mechanically hold the sealing lever in the closed position; and opening the container by hydraulically actuating the one or more latches into an open position to move the mechanical linkage out of the locking configuration and to pivot the sealing levers clear of the container door; and moving the container door away from the opening of the container, wherein the sealing lever is pivotably mounted to the container or to a frame in fixed relation with the container and the mechanical linkage is mounted to the container or to the frame.

BRIEF DESCRIPTION OF THE FIGURES

Further features and advantages will become apparent from the following detailed description, taken in combination with the appended drawing, in which:

FIG. 1A.1 illustrates a perspective view of a container comprising the latching system in accordance with an embodiment of the present disclosure.

FIG. 1A.2 illustrates a perspective view of the container of FIG. 1A.1 from a different perspective.

FIG. 1A.3 illustrates an enlarged view of part A of FIG. 1A.1.

FIG. 1A.4 illustrates an enlarged view of part B of FIG. 1A.1.

FIG. 1A.5 illustrates an enlarged view of part C of FIG. 1A.2.

FIG. 1A.6 illustrates an enlarged view of part D of FIG. 1A.1.

FIG. 1B.1 illustrates a side view of a container comprising the latching system in accordance with an embodiment of the present disclosure.

FIG. 1B.2 illustrates a cross sectional view of the container of FIG. 1B.1.

FIG. 1B.3 illustrates an enlarged view of part E of FIG. 1B.2.

FIG. 1B.4 illustrates an enlarged view of part F of FIG. 1B.2.

FIG. 1B.5 illustrates an enlarged view of part G of FIG. 1B.1.

It will be noted that throughout the appended drawings, like features are identified by like reference numerals.

DETAILED DESCRIPTION

Embodiments of the present disclosure provide for a door sealing system to seal a container of a vacuum system. In a preferred embodiment the vacuum system has a container door supported on a frame and adapted to seal the container when the container door is closed. The present invention further comprises a vacuum system. The vacuum system comprises a frame, a container having a container door, and a container door sealing system. The container is supported on the frame. The container door sealing system comprises a latching assembly.

The vacuum system is supported on a trailer/truck. The vacuum system comprises a water tank, a container, an engine assembly, a container door, a filter assembly, and a frame. The container door can be pivotally supported on the container by the frame.

Referring to the figures illustrating the exemplary embodiments of the presently invention, a door sealing system is provided for a container 100 having a container door 105. The sealing system comprises one or more latches 110 mounted to the container or to a frame 120 in fixed relation with the container. The latches are located proximate to an opening of the container to be covered by the container door, each latch hydraulically actuatable between a closed position (FIGS. 2A, 2B) and an open position (FIGS. 3A, 3B). Each latch includes: a sealing lever 305 pivotably mounted to the container or to the frame; and a mechanical linkage 320 mounted to the container or to the frame. In the closed position, the sealing lever contacts and presses the container door in sealing engagement with the container, the sealing lever being mechanically held in the closed position by the mechanical linkage operating in a locking configuration. In the open position, the mechanical linkage is moved out of the locking configuration and the sealing lever is pivoted clear of the container door.

In one embodiment, the sealing lever comprises a fulcrum 307, an engagement arm 309 and an actuating arm 311. The engagement arm is configured to contact and press the container door in said sealing engagement. The actuating arm is located on an opposite side of the fulcrum from the engagement arm, and the mechanical linkage is pivotably coupled to the actuating arm. The sealing lever may be substantially T-shaped. As such, the end of the actuating arm, the fulcrum, and the end of the engagement arm can be non-collinear, i.e. located at three vertices of a triangle.

In one embodiment, the mechanical linkage comprises an anchor body 325 pivotably mounted to the container or to the frame; and an intermediate link 335 having a first end pivotably coupled to the anchor body and having a second end pivotably coupled to the actuating arm of the sealing lever.

In one embodiment, the sealing system further comprises a hydraulic cylinder 350 pivotably mounted, at a first end 355, to the container or to the frame. The hydraulic cylinder 350 is also pivotably mounted, at a second end 357, to the anchor body. The hydraulic cylinder is thereby configured to provide hydraulic actuation of the latch via actuation of the anchor body and corresponding actuation of the sealing lever via the intermediate link.

Although a hydraulic cylinder has been discussed in this embodiment to provide hydraulic actuation to the latch system, the invention is not limited to this embodiment. Other forms of actuation systems such as a pneumatic piston or other sufficiently strong linear actuator, like a linear motor can be used as the actuating member to provide power to the latch, without departing the spirit and scope of the invention.

In one embodiment, the anchor body comprises: a first pivot location 326 at which the anchor body is pivotably mounted to the container; a second pivot location 327 at which the anchor body is pivotably coupled to the intermediate link; and a third pivot location 328 at which the anchor body is pivotably coupled to the hydraulic cylinder. The first pivot location, the second pivot location and the third pivot location are non-collinear, i.e. arranged in a triangular configuration. The second and third pivot locations are located outward from the first pivot location. The anchor body may accordingly be substantially triangular in shape.

In one embodiment, the sealing system comprises a plurality of the above-described latches mounted circumferentially around the opening of the container.

In one embodiment, of the sealing system the container door is hingedly attached to the container.

In one embodiment, the container is part of a trailer-mounted vacuum system.

In one embodiment, the sealing system further comprises a remote control configured to hydraulically actuate the one or more latches between the open position and the closed position. This facilitates worker safety by providing the capability to control unlatching/unsealing of the container from a distance.

In one embodiment, the container has a pressure of about 10 psi or more.

In another aspect of the present invention, there is provided a vacuum system comprising: a support frame; a container 100 supported on the support frame and having a container door 105; and a door sealing system as described above.

In another aspect of the present invention, there is provided a method for operating a container door of a container. The method comprises sealing the container by: disposing the container door over a corresponding opening of the container; and hydraulically actuating one or more latches into a closed position to cause respective sealing levers thereof to contact and press the container door in sealing engagement with the container, and to cause a mechanical linkage to operate in a locking configuration to mechanically hold the sealing lever in the closed position. The method additionally or alternatively comprises opening the container by: hydraulically actuating the one or more latches into an open position to move the mechanical linkage out of the locking configuration and to pivot the sealing levers clear of the container door; and moving the container door away from the opening of the container. The sealing lever is pivotably mounted to the container or frame and the mechanical linkage is mounted to the container or frame.

With reference to FIGS. 2A, 2B, 3A and 3B, when the hydraulic cylinder 350 is extended, the pivotably mounted anchor body 325 is rotated toward the container door 105. The third pivot location 328 moves away the container door and outward from the container 100, and the second pivot location 327 correspondingly moves toward the container door and inward toward the container 100. This causes the intermediate link 335 to move toward the container door 105 while also causing a first end 337 of the intermediate link (coupled to the anchor body) to move inward toward the container 100. The motion of the intermediate link, coupled on at the first end 337 to the anchor body 325 and at a second end to the sealing lever 305, causes the sealing lever to move into contact with the container door (when closed). The intermediate link is also moved into an angled position which results in a mechanical locking action. In the locking action, the anchor body 325 backstops the intermediate link, so that axial force along the main axis of the intermediate link toward the anchor body does not tend to pivot the anchor body in such a manner that the second pivot location 327 would move outward away from the container 100. In fact, such axial force may tend to pivot the anchor body such that the second pivot location 327 would tend to move further inward toward the container 100. Due to this mechanical locking action, the sealing lever is held in place even if hydraulic power to the cylinder 350 is released.

In some embodiments, the mechanical locking action can further be characterized as follows. Outward pressure on the container door exerts a pivoting force on the sealing lever 305 which in turn results in a force on the intermediate link 335. The force on the intermediate link in turn results in a force on the anchor body 325. However, due to the dimensions and placement of the sealing lever, intermediate link, and anchor body (including their anchor point and linkage point placements), the force exerted by the intermediate link onto the anchor body is in a first direction, for example substantially coaxial with the intermediate link (when in the closed position). Now, because the anchor body is pivotably mounted to the container, forces exerted on the anchor body at the second pivot location 327 can be decomposed into a radial force and a tangential force. The radial force is the component that is directed from the second pivot location 327 toward the first pivot location 326. The tangential force is the remaining component that is perpendicular to the radial force. Now, the dimensions and placement of the components are configured such that the tangential force (if any) is directed inward from the second pivot location 327 toward the container. The dimensions and placement of the components can further be configured such that this tangential force is substantially smaller in magnitude than the radial force. As such, pressure from the container will cause the anchor body to pivot further into the closed position rather than away from the closed position. It is also noted that the dimensions and placement of the components are configured such that the latching system can be moved between the open and closed positions.

In some embodiments, a bearing surface attached to the container is provided which portions of the latching system can rest against, to backstop the tangential force. For example, as illustrated the frame 120 may be profiled to include a seat 336 for the intermediate link 335. The link 335 can rest against the seat, thus countering tangential force tending to move the latching system further into the closed position. Additionally or alternatively, the anchor body 325 (i.e. the edge face between the first and second pivot locations) can contact and rest against the tank or a bearing surface (e.g. a block or wedge) attached to the tank.

The intermediate link and the sealing lever can be positioned and dimensioned so that a desired amount of force is exerted by the sealing lever against the door when the latches are in the closed and locked position. In some embodiments, the intermediate link is adjustable in length, thereby adjusting the amount of force. For example, the intermediate link may include a central cylindrical body with at least one and typically a pair of end pieces. The cylindrical body is inserted into apertures in the end pieces. The apertures and cylindrical body are threaded (using a helical inclined plane or screw mechanism). By relatively rotating the cylindrical body and end piece, the position of the end piece can be adjusted, thereby changing the length of the intermediate linkage. Preferably, the length of the intermediate link is set so that, in the closed position, the sealing lever presses firmly against the door, but also such that the hydraulic cylinder has sufficient power to move the linkage between the open and closed positions.

When the hydraulic cylinder is retracted, the anchor body is rotated away from the container door, pulling the intermediate link in the same direction. The intermediate link pulls on the actuating arm, thus moving the sealing lever into the open position. Thus the mechanical linkage is moved out of the closed, locking position and the sealing lever is pivoted clear of the door.

Pivotal mounts and couplings can be achieved using pins, bearings, or other pivoting connections, or a combination thereof. In various embodiments, each pivotal coupling is pivotable primarily in a single direction, i.e. about a single axis. Pivoting in other directions may be restricted. In some embodiments, each pivotal couplings of a given latching system is pivotable about a respective axis, all of these axes being parallel to each other.

Figure 2A:
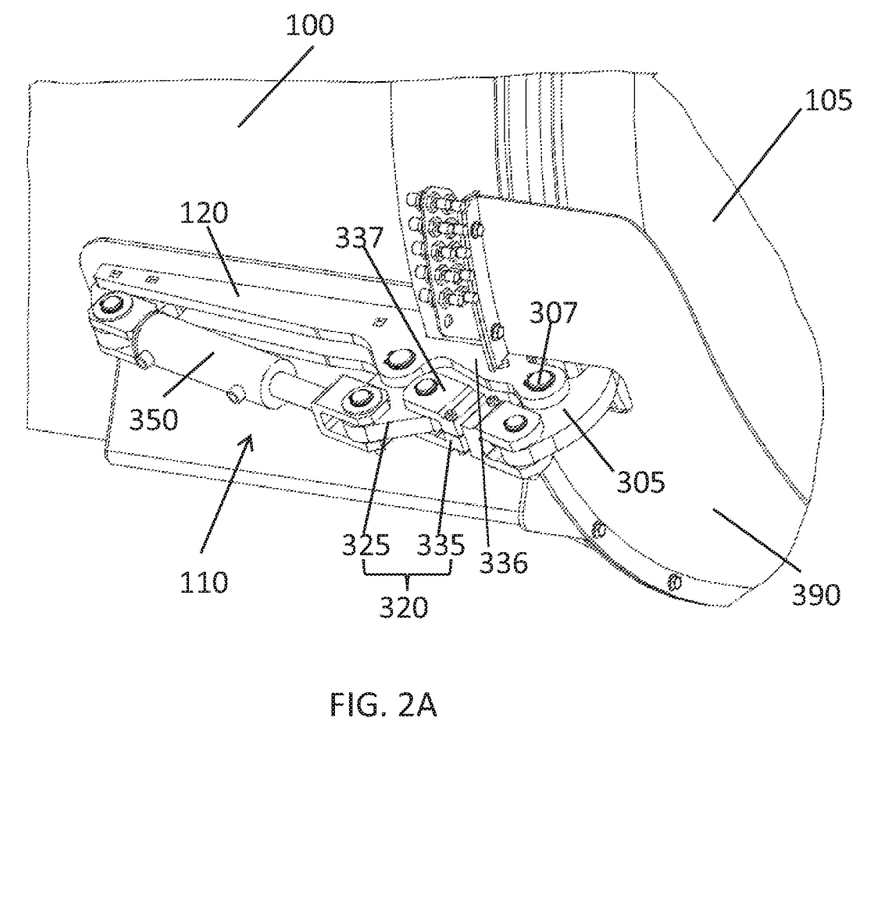
FIGS. 2A and 3A illustrate partial side views of a container with a latching system in accordance with an embodiment of the present disclosure in closed and open positions, respectively.
Figure 2B:
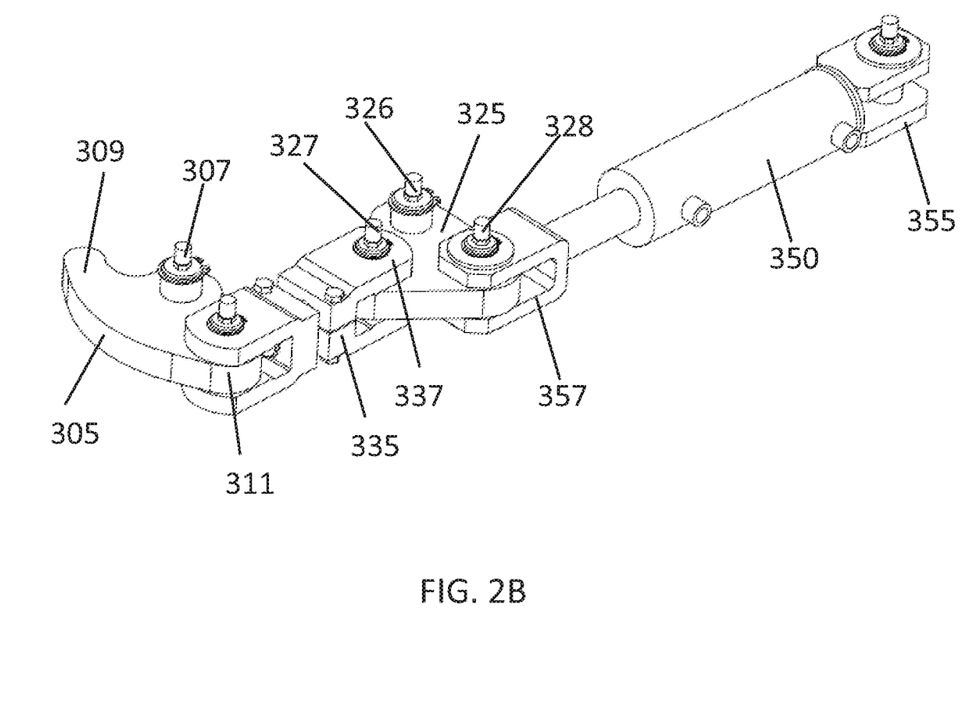
FIGS. 2B and 3B illustrate a latching system in accordance with an embodiment of the present disclosure in closed and open positions, respectively.
Figure 3A:
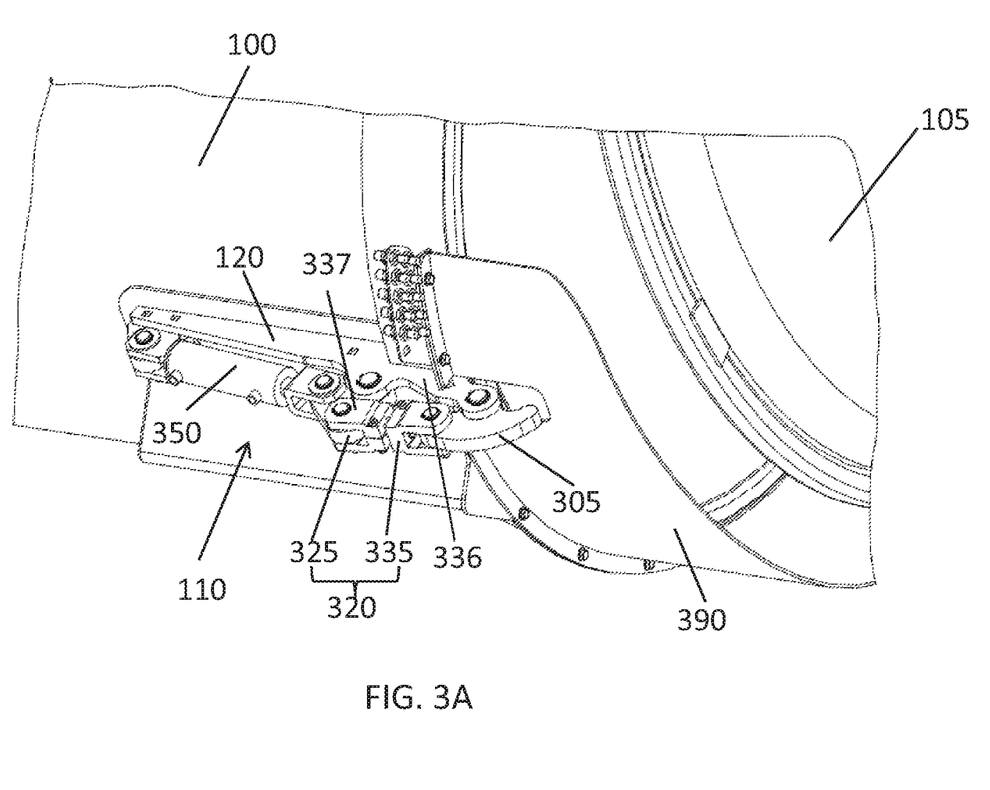
Figure 3B:
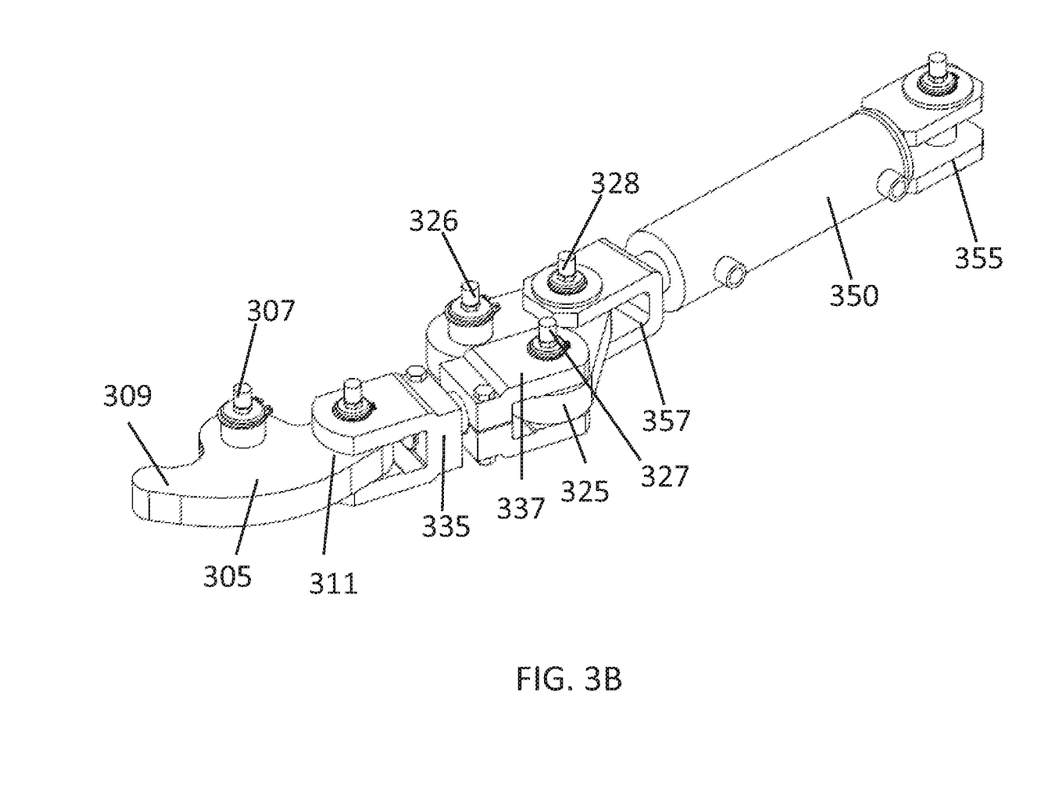

FIGS. 2A and 3A further show a shield 390 having an aperture through which the sealing lever 305 can pass to engage the container lid.

A hydraulic power pack supplies hydraulic power to the hydraulic cylinders via hydraulic fluid lines. The hydraulic power pack can be operated remotely, for example by a worker standing clear of the container door. Other (e.g. linear) actuator technologies can be used in place of hydraulics. For example, the hydraulic cylinders can be replaced with electrical motors or pneumatic cylinders. As another example, a mechanical linkage or transmission can be used to actuate the latches, with the mechanical linkage connected at one end to the latches and at another end to a source of mechanical power, for example manual power, an electric motor, or a hydraulic or pneumatic motor.

Figures 1A, 1A, 1A, 1A, 1A, 1A:
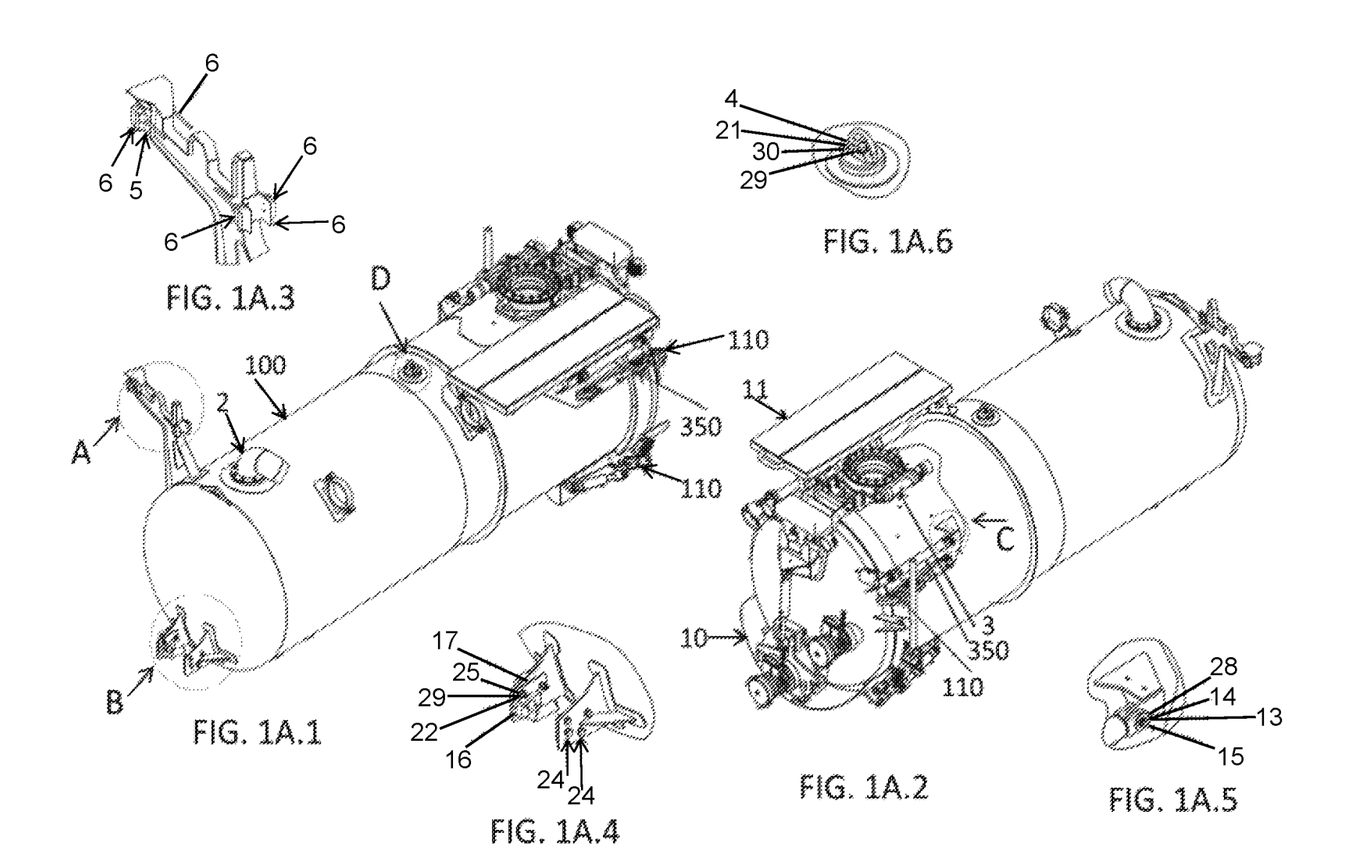

Details of different parts in FIGS. 1A.1 to 1B.5 are illustrated as follows. The container comprises the latching system discussed above. Multiple such latching systems can be provided in a spaced-apart configuration around the container. In more detail, there is provided a tank 100, such as a 54" diameter tank. A shutoff assembly 2 (e.g. a 6 inch assembly) is connected to the tank. A bearing slew assembly 3 is also mounted on the tank. An anchor fall protection 4 is mounted on top of the tank via a cap 21 and a flat washer 29 and a washer lock 30, details of which are shown in FIG. 1A.6. Boom safety switches 5 and micro-switches 6 are also provided. There is a large seal 7 around a top opening for sealing the opening, details of which are shown in FIG. 1B.4.

Figures 1B, 1B, 1B, 1B, 1B:
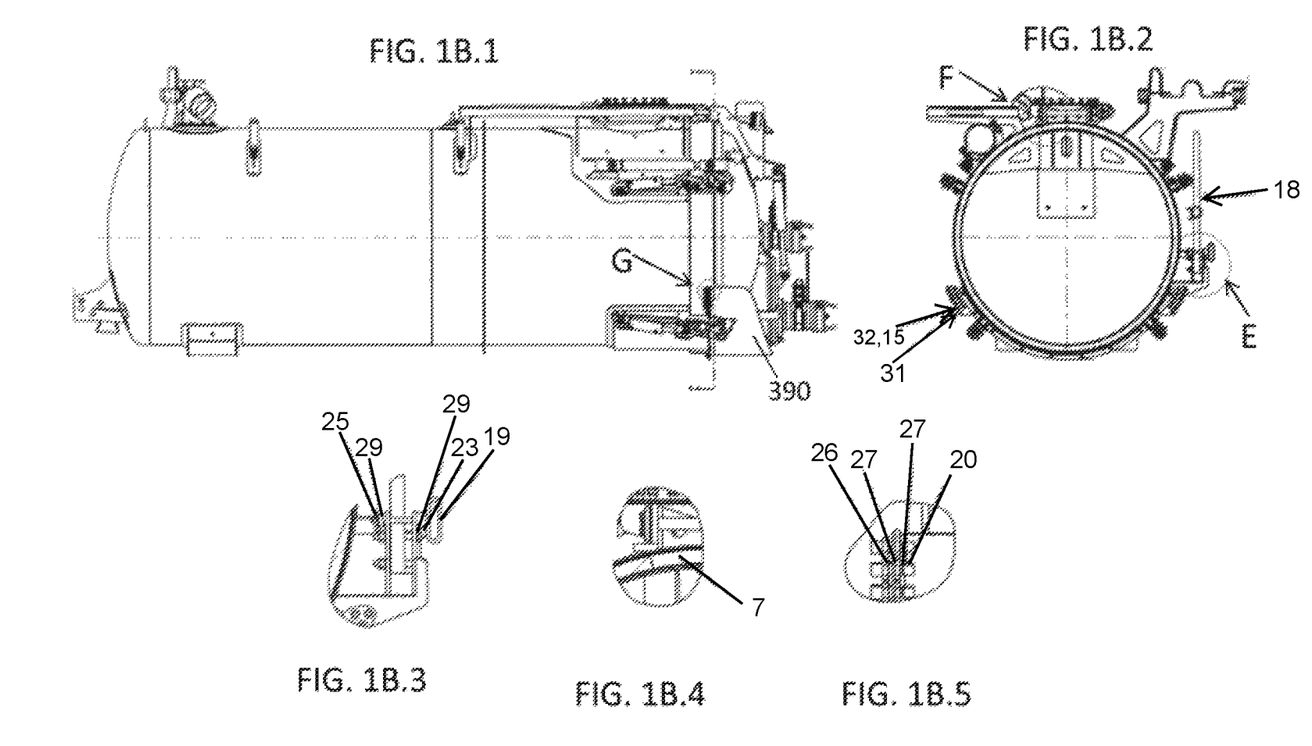
Figure 1C:
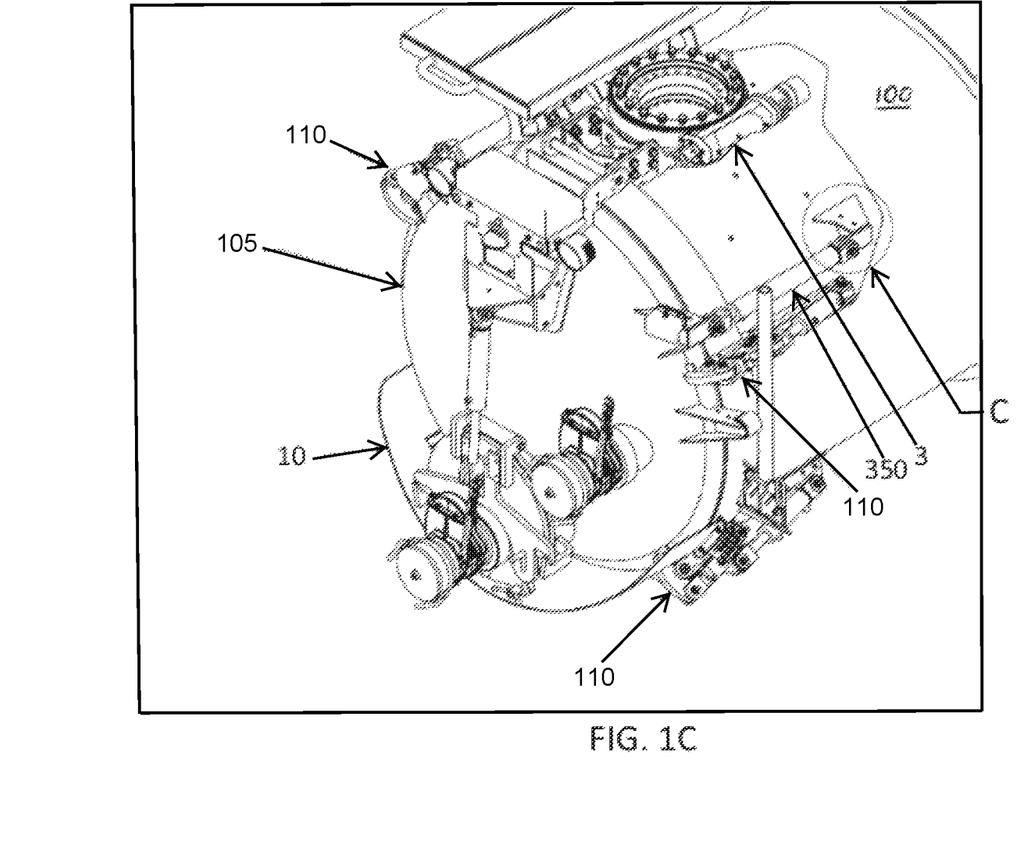
FIG. 1C illustrates an enlarged view of part of one of the perspective views of FIG. 1A.1.

There are four lock-door assemblies 110 for safely locking the door of the tank. These lock-door assemblies correspond to the latching system as described elsewhere herein. More or fewer lock-door assemblies 110 can alternatively be provided. A Chute 10 is also provided. A catwalk 11 is provided and positioned above and beside the container for access purposes. Hydraulic cylinders 350 are mounted on the tank each with one end connected to the tank through a pin 13, a ring 14, a nipple 15 and a flat washer 28, details of which are shown in FIG. 1A.5. Each of the lock-door assemblies 110 is coupled to a corresponding one of the hydraulic cylinders 350, so that the hydraulic cylinders actuate the lock-door assemblies when operated. Two hoist blocks 16 are installed on the side of the tank, in particular on the insides of the protrusions/flanges 17. There is a safety post 18 on one side of the tank. A ring handle 19 is tightened to the safety post 18 through caps 23, nut 25 and flat washers 29, shown in FIG. 1B.3.

Various caps 20, 22, 24, for example fitted overtop of bolts, are also shown. FIG. 1B.5 also illustrates nuts 26 and washers 27 as affixing components, for example assisting with fixing the shield 390 to the tank 100. A protrusion/flange 31 and associated nipple/frame members 32, 15 are also provided for fixing the shield 390 to the tank 100.

It is noted that the details and dimensions described above with respect to FIGS. 1A.1 to 1B.5 can be varied without departing from the spirit and scope of the invention.

The hydraulically activated automatic latching system of the present invention, comprising the latches as discussed above allow full opening of container/tank rear door, to absorb vacuum and internal pressure without traditional manual wing nut latches on common vacuum trucks. The latching system of the present invention also positively lock rear door of a container in mechanical way in working position which eliminates need for hydraulic load holding valves that otherwise would be necessary in event of hydraulic pressure loss or hydraulic hose break.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope.

I claim:

1. A door sealing system for a container having a container door, the sealing system comprising:
   one or more latches mounted to the container, the latches located proximate to an opening of the container to be covered by the container door, each latch actuatable between a closed position and an open position and comprising: a sealing lever pivotably mounted to the container and; a mechanical linkage mounted to the container, and a hydraulic cylinder, wherein:
   the sealing lever comprises an engagement arm and an actuating arm,
   the mechanical linkage comprises an intermediate link and an anchor body, and
   the hydraulic cylinder is pivotably mounted, at a first end, to the container, and pivotably mounted, at a second end, to the anchor body, wherein the intermediate link has a first end pivotably coupled to the anchor body and a second end pivotably coupled to the actuating arm of the sealing lever;
   upon actuation of the hydraulic cylinder on the anchor body, the anchor body rotates thereby enabling the sealing lever to rotate via the intermediate link such that the one or more latches switches between the closed position and the open position;
   in the closed position, the engagement arm contacts and presses the container door in sealing engagement with the container, the sealing lever being mechanically held in the closed position by the mechanical linkage operating in a locking configuration; and in the open position, the mechanical linkage is moved out, and wherein:
   in the closed position, the sealing lever contacts and presses the container door in sealing engagement with the container, the sealing lever being mechanically held in the closed position by the mechanical linkage operating in the locking configuration; and
   in the open position, the mechanical linkage is moved out of the locking configuration and the sealing lever is pivoted clear of the container door;
   wherein the container is a pressurized container.

2. The sealing system of claim 1, wherein the sealing lever further comprises a fulcrum, wherein the actuating arm is located on an opposite side of the fulcrum from the engagement arm, and wherein the mechanical linkage is pivotably coupled to the actuating arm.

3. The sealing system of claim 1, wherein the anchor body comprises:
   a first pivot location at which the anchor body is pivotably mounted to the container;
   a second pivot location at which the anchor body is pivotably coupled to the intermediate link; and
   a third pivot location at which the anchor body is pivotably coupled to the hydraulic cylinder, and wherein the first pivot location, the second pivot location and the third pivot location are non-collinear.

4. The sealing system of claim 1, comprising a plurality of the latches mounted circumferentially around the opening of the container.

5. The sealing system of claim 1, wherein the container door is hingedly attached to the container.

6. The sealing system of claim 1, wherein the container is part of a trailer-mounted or truck mounted pressure system.

7. The sealing system of claim 1, further comprising a remote control configured to hydraulically actuate the one or more latches between the open position and the closed position.

8. A method for operating a container door of a pressurized container of the system as defined in claim 1, the method comprising:
   sealing the container by:
      disposing the container door over a corresponding opening of the container; and
      hydraulically actuating one or more latches into a closed position to cause respective sealing levers thereof to contact and press the container door in sealing engagement with the container, and to cause a mechanical linkage to operate in a locking configuration to mechanically hold the sealing lever in the closed position; and
   opening the container by:
      hydraulically actuating the one or more latches into an open position to move the mechanical linkage out of the locking configuration and to pivot the sealing levers clear of the container door; and
      moving the container door away from the opening of the container, wherein the sealing lever is pivotably mounted to the container or to a frame in fixed relation with the container and the mechanical linkage is mounted to the container or to the frame.

9. A latching system for locking a container door to a container, comprising
   a sealing lever pivotably mounted to the container; a mechanical linkage mounted to the container; and a hydraulic cylinder; wherein:
   in a closed position, the sealing lever contacts and presses the container door in sealing engagement with the container, the sealing lever being mechanically held in the closed position by the mechanical linkage operating in a locking configuration; and
   in an open position, the mechanical linkage is moved out of the locking configuration and the sealing lever is pivoted clear of the container door;
   wherein the sealing lever comprises: a fulcrum, an engagement arm and an actuating arm, the engagement arm configured to contact and press the container door in said sealing engagement, the actuating arm located on an opposite side of the fulcrum from the engagement arm, and wherein the mechanical linkage is pivotably coupled to the actuating arm;
   wherein the mechanical linkage comprises:
      an anchor body pivotably mounted to the container, and
      an intermediate link having a first end pivotably coupled to the anchor body and having a second end pivotably coupled to the actuating arm of the sealing lever;
   wherein the hydraulic cylinder is pivotably mounted, at a first end, to the container, and pivotably mounted, at a second end, to the anchor body, the hydraulic cylinder thereby configured to provide a hydraulic actuation of the latch via actuation of the anchor body and corresponding actuation of the sealing lever via the intermediate link; and
   wherein the anchor body comprises:
      a first pivot location at which the anchor body is pivotably mounted to the container;
      a second pivot location at which the anchor body is pivotably coupled to the intermediate link; and
      a third pivot location at which the anchor body is pivotably coupled to the hydraulic cylinder, and wherein the first pivot location, the second pivot location and the third pivot location are non-collinear,
   wherein the container is a pressurized container.

10. A latching system of claim 9, wherein the hydraulic cylinder is extended to apply a pushing force on the anchor body so that the engagement arm of the sealing level is pushed to rotate toward the container door, and presses the container door in sealing engagement with the container in the closed position.

11. A latching system of claim 10, wherein the hydraulic cylinder is retracted and applies a pulling force on the anchor body so that the engagement arm of the sealing level is pulled to move away from the container door to the open position.

12. The latching system of claim 1, wherein the container is part of a trailer-mounted or truck mounted pressure system.

13. The door sealing system of claim 1, wherein the one or more latches is mounted to a frame in fixed relation with the container.

14. The latching system of claim 9, wherein the sealing lever is mounted to a frame in fixed relation with the container.

* * * * *